United States Patent [19]
Bretschneider et al.

[11] Patent Number: 6,008,807
[45] Date of Patent: *Dec. 28, 1999

[54] METHOD AND SYSTEM FOR CONTROLLING THE DISPLAY OF OBJECTS IN A SLIDE SHOW PRESENTATION

[75] Inventors: Richard Bretschneider, San Jose; Dennis Robert Austin, Los Altos; Hannes Helmut Ruescher, Palo Alto, all of Calif.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/892,361

[22] Filed: Jul. 14, 1997

[51] Int. Cl.$^6$ ...................................................... G06F 3/00
[52] U.S. Cl. ........................................... 345/339; 345/974
[58] Field of Search ...................................... 345/339–341, 345/349, 354, 357, 970, 973–974; 707/501

[56] References Cited

U.S. PATENT DOCUMENTS 5,363,482  11/1994  Victor et al. .............................. 345/157
5,640,522   6/1997  Warrin ..................................... 345/346

OTHER PUBLICATIONS

Philip Bishop, "Gold Disk's presentation app Astounds with multimedia: business slide show program adds pizazz to static visuals.", MacWEEK, v7, n27, p37(3), Jul. 5, 1993.

Rich Grace, "Using PowerPoint 4 For Windows", QUE, 37–57, 274–275, 1994.

*Delta Graph Professional, For Macintosh*, Delta Point, Inc., Monterey, California, 1989. Chapter 13.

*Microsoft PowerPoint for Windows 95, Step by Step*, Microsoft Press, Redmond, Washington, 1995. "Getting Ready"; Lessons 1, 2, 12, and 13; Appendix B.

*Primary Examiner*—John E. Breene
*Assistant Examiner*—X. L. Bautista
*Attorney, Agent, or Firm*—Christensen O'Connor Johnson & Kindness PLLC

[57] ABSTRACT

A computer-based system and method of viewing an electronic slide show presentation providing three modes for viewing an electronic slide show: a speaker presentation mode, an individual browser mode, and a kiosk browser mode. For each mode, a user interface having features desirable in the corresponding mode is provided. The speaker presentation mode user interface displays slides sized to fill a computer display screen. The individual browser mode user interface displays slides within an application window and provides a navigation scrollbar for navigating the slides. The navigation scrollbar having advance and reverse buttons for controlling the display of builds in the slide, and previous and next slide buttons for controlling the display of slides. The kiosk browser mode user interface displays full screen slides and restricts a viewer's navigational functions. The method also provides a user with the ability to customize the user interface corresponding to a slide presentation.

25 Claims, 12 Drawing Sheets

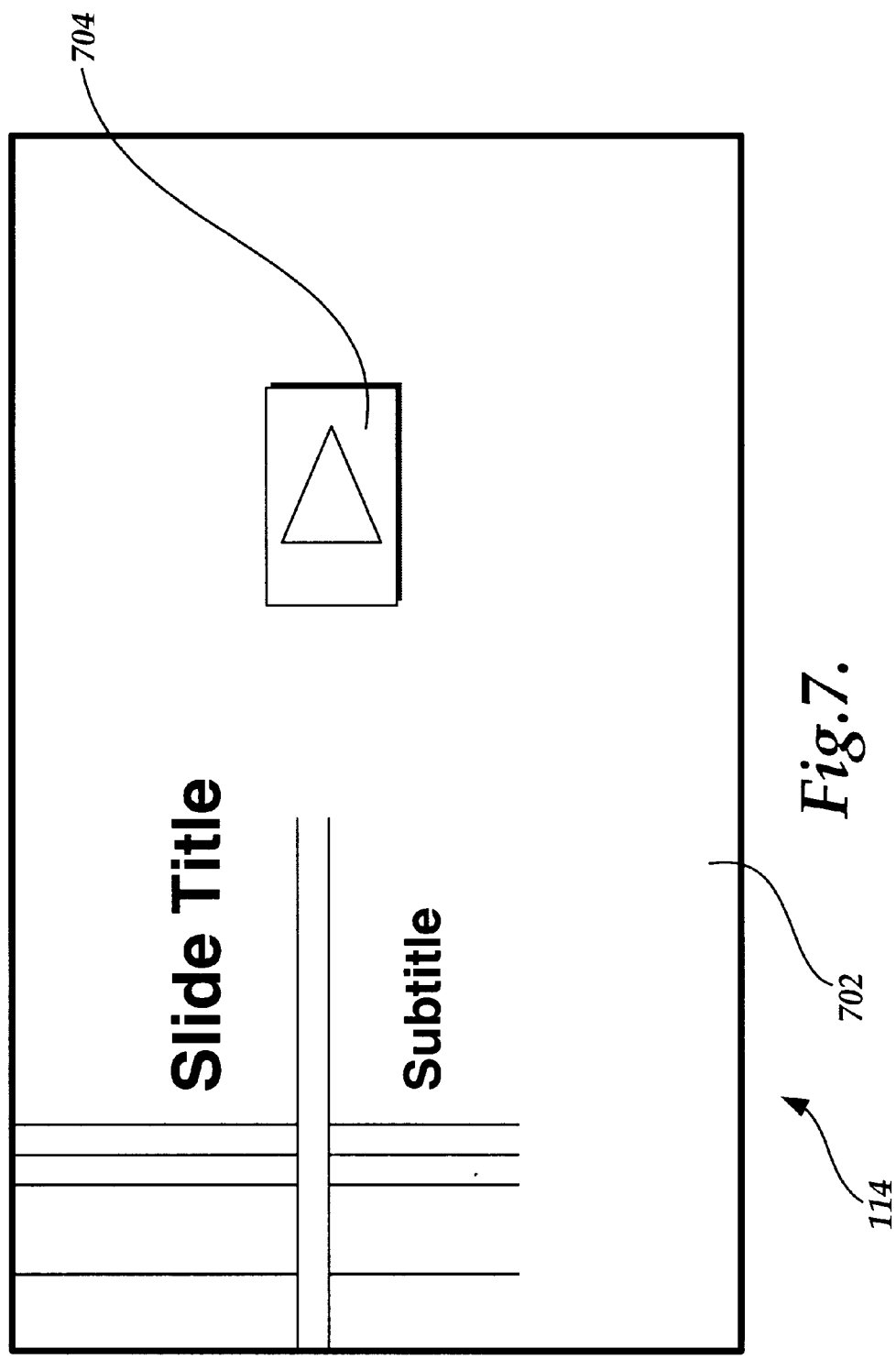

METHOD AND SYSTEM FOR CONTROLLING THE DISPLAY OF OBJECTS IN A SLIDE SHOW PRESENTATION

FIELD OF THE INVENTION

The present invention relates to the field of slide presentation computer software and, in particular, to methods and systems for viewing a slide show presentation.

BACKGROUND OF THE INVENTION

Slide presentation programs are computer programs that enable a user to create, edit, manage, and perform "presentations" on a computer. One example of a popular slide presentation program is Microsoft PowerPoint®, available from Microsoft Corporation, of Redmond, Wash. A slide presentation includes a set of electronic "slides," each slide corresponding to one screen or page of output. An electronic slide may also be converted to a 35 mm slide or overhead transparency and displayed in a standard slide projector or overhead projector. Each slide contains one or more objects, such as text, graphical images, or graphical animation. A slide may also include a sound object that is played when the slide is displayed during a "slide show" performance.

A slide presentation program "performs" a "slide show" by sequentially displaying a series of slides contained within the slide presentation. The slides are displayed on a display screen, which may be part of a computer monitor or a separate surface onto which an image is projected. During a performance of a slide show, a speaker controls the performance by invoking commands to advance the slide show. A command can be entered using a keyboard, a mouse, or other suitable input device. Alternatively, an author of a slide presentation can include slide "timings" with each slide. A slide timing corresponding to a slide indicates the number of seconds that the slide is displayed before the slide presentation program automatically advances to the next slide. During a performance of a slide show, the slide presentation program automatically advances to the next slide when the existing slide's timing ends.

A slide can include one or more display objects that are incrementally displayed during a slide show. For example, a slide may initially appear with one bullet item. Sequential advancement of the slide show causes additional bullet items to be displayed. Display objects, such as bullet items, that are incrementally displayed are referred to as "builds."

PowerPoint® 95 provides an author with the ability to create and edit slides. It also provides a speaker with the ability to perform a slide show. During a slide show, a set of slides is sequentially displayed and each slide is enlarged to fill the entire display screen. Clicking a mouse button while a slide is displayed causes PowerPoint® to present the next slide or build in sequence. A mouse click on the last slide of the presentation causes the slide show to terminate.

It may be inconvenient or uneconomical to have a speaker narrate and perform the slide show every time one or more people desire to view the presentation. In a number of situations, an individual may desire to view a slide show when a speaker is not available. For example, it is desirable to allow workers to view slide presentations containing training information at their convenience, rather than at a fixed time and location when a speaker is available. A slide presentation can also be made available on a large network, such as the Internet, that allows individuals to download the slide presentations and perform slide shows on their local computers.

It is desirable to have a mechanism that allows a slide show viewer to individually browse through the slides of a slide presentation. Preferably, such a mechanism includes a user interface that provides a slide show viewer with mechanisms appropriate to an individual viewer navigating and browsing a slide presentation. The present invention is directed to providing such a mechanism.

It is also desirable to provide a mechanism that allows a "kiosk viewer" to view a slide show on a restricted computer. Preferably, such a mechanism includes a user interface that restricts the operations that the kiosk viewer can perform, and allows limited navigation and functions during a slide show. The present invention is directed to providing such a mechanism.

SUMMARY OF THE INVENTION

In accordance with this invention, a system and computer-based method of viewing an electronic slide show presentation is provided. The method provides three modes for viewing the electronic slide show presentation: a speaker presentation mode, an individual browser mode, and a kiosk browser mode. For each mode, the method provides a user interface having features desirable in the corresponding presentation mode. In the speaker presentation mode, slides are displayed and sized to fill a computer display screen. In the individual browser mode, slides are displayed within an application window. In the kiosk browser mode, slides are displayed and sized to fill the computer display screen, and restricted navigational functions are provided.

In accordance with other aspects of this invention, in the individual browser mode, a navigation scrollbar having a next slide button, a previous slide button, an advance button, and a reverse button control the electronic slide show displayed within the graphical user interface window. Manipulation of the next slide button or the previous slide button controls the display of slides. Manipulation of the advance button or the reverse button controls the display of slides and graphical objects on a slide. Preferably, the navigation scrollbar is not displayed or available in speaker presentation mode or kiosk browser mode.

In accordance with other aspects of this invention, in individual browser mode, a context menu provides a mechanism for controlling a slide show presentation. Preferably, the context menu includes an advance command item and a reverse command item. The advance command item operates to advance the slide show, and the reverse command item operates to step the slide show in a reverse direction. During an individual browser mode slide show, a user can manipulate the position and size of a graphical user interface window, as well as other application windows.

In accordance with yet still other aspects of this invention, in individual browser mode, commands to advance a slide show that occur when the last slide of the slide show is displayed causes the display of a warning message. A command to advance the slide show when the warning message is displayed causes termination of the slide show.

In accordance with further aspects of this invention, in speaker presentation mode, a pen tool is provided that allows the user to draw on the computer display screen. Preferably, the pen tool is not provided in individual browser mode or in kiosk browser mode, and writing on the display screen is only available during speaker presentation mode.

In accordance with still further aspects of this invention, in kiosk browser mode, the mechanism of the invention automatically restarts a slide show after termination of the slide show. Additionally, if an input command is not received for a predetermined length of time during a kiosk browser mode slide show, the mechanism of the invention automatically restarts the slide show.

As will readily be appreciated from the foregoing description, a method of viewing an electronic slide show in one or more of three modes of operation provides a way of customizing a slide show to an audience type. The invention allows a speaker to present a slide show with a user interface that is designed for a speaker presentation. The invention also allows an individual user to view a slide show with a user interface that is designed for an individual viewing of a slide show without a speaker. The method further provides a kiosk browser with a way of viewing a slide show in a restricted manner, so that a slide show author can predetermine a limited number of sequences for viewing the slide show. Additionally, the automated mechanism is active during a kiosk browser slide show provides for repeated viewers that may view all or a portion of a slide show. Additionally, by providing a mechanism for customizing the slide show user interface to a limited degree, the method of the invention further correlates the user interface with the desires of a slide show author or viewer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 7 illustrates a computer display containing a slide during a kiosk browser presentation;

DETAILED DESCRIPTION OF THE PREFERRED EMBODIMENT

The present invention provides a mechanism for viewing a slide show presentation. The mechanism of the invention provides three distinct "modes" of slide show presentation: speaker presentation, individual browser presentation, and kiosk browser presentation. Speaker presentation mode is typically employed when a speaker performs a slide show for a group of people. Individual browser mode is typically used when an individual desires to browse the slides of one or more presentations at a computer where the individual is enabled to control various application level functions of the computer. Kiosk browser mode is typically employed for individuals who are provided only the ability to view a slide show on a computer, and where the individuals have restricted access to other functions of the computer.

Figure 1:
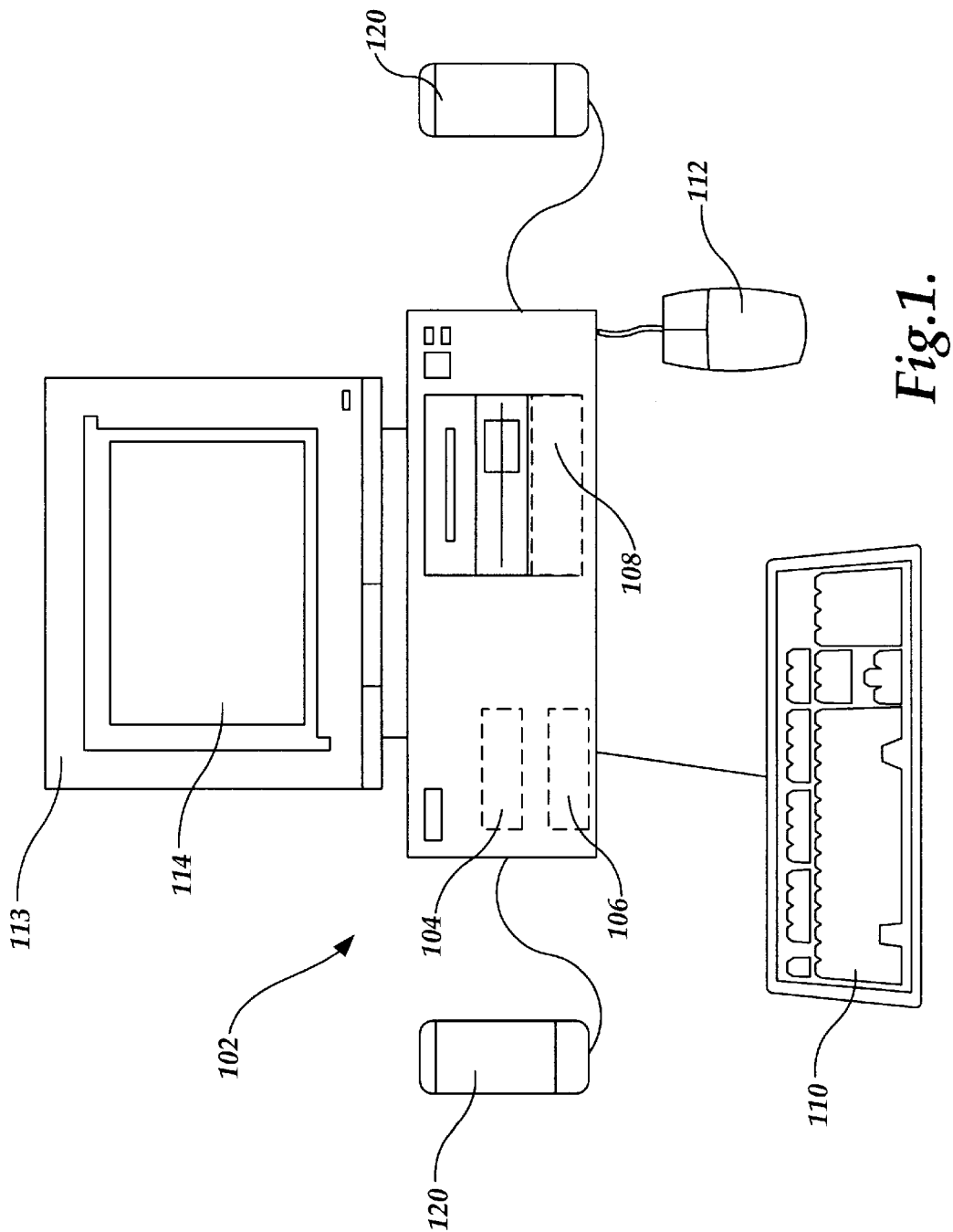
FIG. 1 is a pictorial diagram illustrating a computer system for implementing the present invention.

In accordance with the present invention, a slide presentation program executes on a computer, preferably a personal computer. FIG. 1 illustrates a computer system 102 for implementing the present invention. The computer system 102 generally comprises a central processing unit (CPU) 104, an internal memory 106, and a permanent storage medium, such as a disk drive 108. The computer system 102 also includes a keyboard 110 and a pointing device, such as a mouse 112, for entering commands and data The CPU 104 and a display device such as a monitor 113 generate a graphical user interface that is shown on a display screen 114. Preferably, the computer system 102 further includes circuitry, such as a sound card (not shown), for playing audio signals through an audio output device, such as a set of speakers 120.

An operating system and a slide presentation application program, as well as other programs, preferably reside in the internal memory 106 and execute on the CPU 104. The Windows 95® operating system is a preferable operating system and provides a well-known graphical user interface. Those skilled in this art, and others, should appreciate that the mechanism of the present invention may be practiced on computer systems with variant architectures. For example, in some architectures a display device projects images onto an associated display screen.

Figure 2:
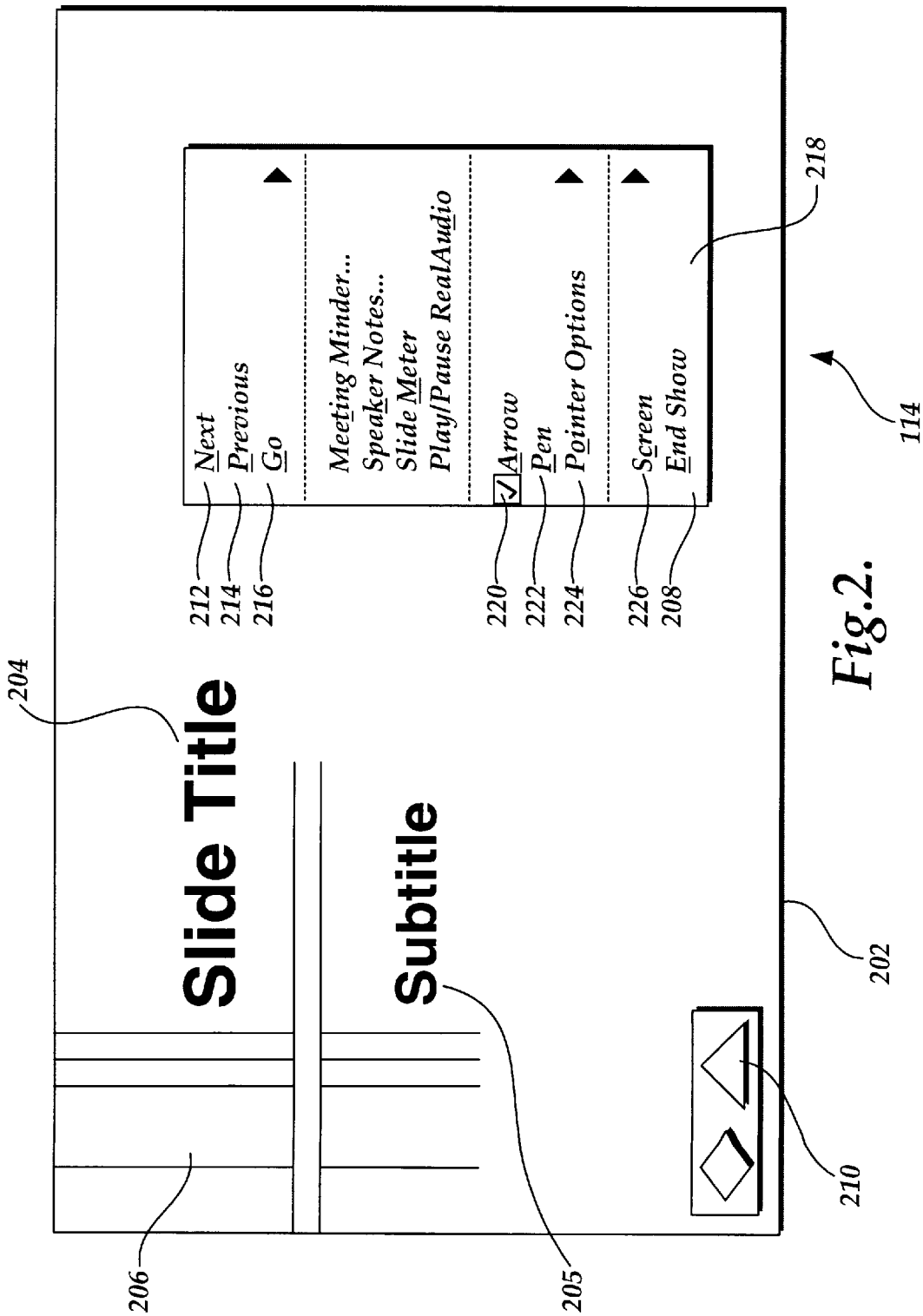
FIG. 2 illustrates a computer display containing a slide and a context menu during a speaker presentation.

FIG. 2 illustrates a computer display screen 114 containing a slide 202 during a speaker presentation. The slide 202 fills the entire display portion of the computer display screen. In speaker presentation mode, the display screen 114 does not include the standard Windows 95® title bar and system controls for manipulating a window. The display screen 114 also does not contain the standard Windows 95® menu bar for selecting application menu commands.

As depicted in FIG. 2, the slide 202 contains text 204 and 205 and graphics 206. Text or graphics may be incrementally displayed on a slide. For example, in the slide 202 depicted in FIG. 2, the "Slide Title" text 204 is displayed during a slide show when the slide 202 is displayed. The "Subtitle" text 205 is incrementally displayed during a slide show. As discussed in further detail below, in response to a command to advance the slide show, the "Subtitle" text 205 is displayed. A user may configure the slide 202 so that the "Subtitle" text 205 is displayed in an animated manner. For example, the text may appear as though it approaches its final position from one side of the display screen. Text or graphic objects, such as the "Subtitle" text 205, that are not initially displayed on a slide are referred to as "builds."

A context menu 208 contains commands for navigating through the slide show as well as several display options. During a speaker presentation, the context menu 208 is normally not visible, and is displayed in response to a user command. For example, in one actual embodiment, a user click on the right mouse button causes the context menu to be displayed at the location of the pointer associated with the mouse. In the actual embodiment, the context menu 208 is also displayed in response to a user clicking on a context menu icon 210. The context menu icon 210 is normally hidden during a speaker presentation, and is displayed in response to a user dragging a pointer across the display screen. The pointer is a component of the Windows 95 operating system. The position of the pointer is responsive to movement of the pointing device.

The context menu contains three commands for navigating a slide show: a "Next" command 212; a "Previous" command 214; and a "Go" command 216. A selection of the next command 212 causes the presentation program to display the next build according to the predetermined sequence of builds for the current slide. If there are no builds remaining on the current slide, the next command 212 causes the slide presentation program to display the next slide 202.

The previous command 214 causes the slide presentation program to remove the current build. If there are no builds to remove on the current slide, the previous command 214 causes the slide presentation program to remove the current slide 202 and display the previous slide in the predetermined sequence of slides. If the current slide 202 is the first slide of the slide show and no builds are displayed, the previous command 214 does not alter the display.

A selection of the go command 216 causes the slide presentation program to display a submenu (not shown) that contains commands for "jumping" to slides outside of the predetermined sequence of slides. The go command 216 allows a user to select a slide by its title or by its slide number.

The context menu 208 also includes an "End show" command 218 that terminates the current slide show. In one actual embodiment, when the current slide show is terminated during speaker mode, a user can edit the slide show.

The context menu 208 further includes three menu commands for modifying the display during a speaker presentation: an "Arrow" command 220; a "Pen" command 222; and a "Pointer options" command 224. The arrow command 220 and the pen command 222 are mutually exclusive options that control the appearance and behavior of the mouse pointer. Selection of the arrow command 220 causes the pointer to appear as an arrow. Selection of the pen command 222 causes the pointer to appear as a pen. When the pointer appears as a pen, a speaker can "write" on the display screen 114 by holding down the mouse button and dragging the pointer over the slide. The pointer options command 224 provides a user with the ability to change the pen color, thereby changing the color of the "writing" on the display screen. Writing on the screen creates a temporary writing on the screen. The writing is removed when the slide show is advanced, reversed, or otherwise changed from the current slide and build. The pointer options command 224 also provides a user with the ability to hide the pointer, so that it is not visible during the slide show.

A "Screen" command 226 provides a speaker with several options pertaining to the screen display. The screen command 226 provides the ability to erase all "writing" on the display screen. The screen command 226 also provides the ability to temporarily remove the current slide and blacken the screen. This feature is used when a speaker desires a blank screen in order to write on the screen with the electronic pen. The screen command 226 further provides a user with the ability to pause a slide show if the slide presentation is set up to automatically advance slides based on predetermined timings. This feature is discussed in further detail below. As depicted in FIG. 2, the speaker mode context menu includes additional menu commands that are not described herein.

Figure 3:
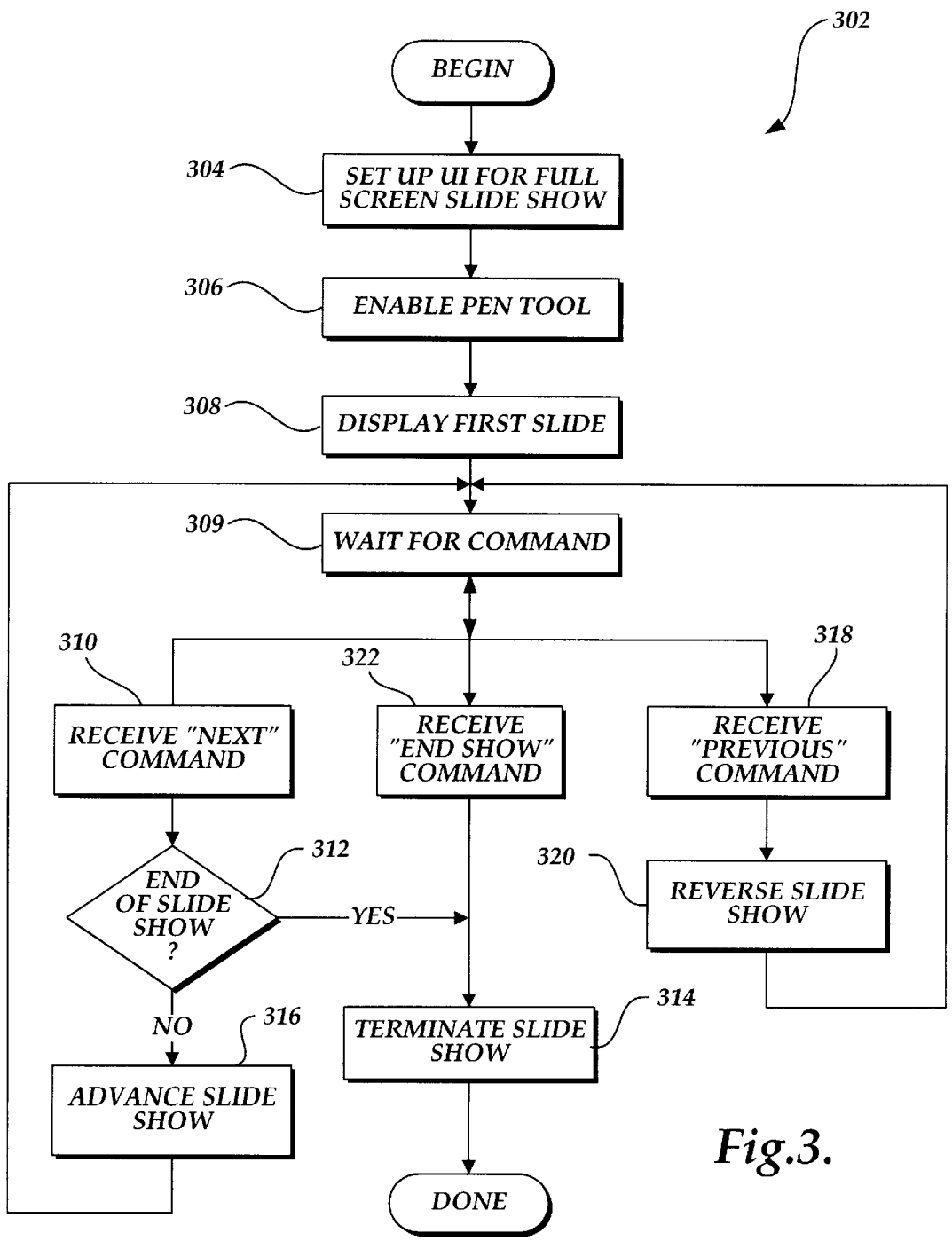
FIG. 3 is a flow diagram illustrating the process of performing a speaker presentation mode slide show.

FIG. 3 illustrates a process 302 of performing a slide show in speaker presentation mode. At step 304, the user interface is set up to display slides sized to fill the display screen 114 (FIG. 1). At step 306, the pen tool is enabled. At step 308 the slide presentation program displays the first slide of the slide show.

At step 309, the slide presentation program waits for one of a plurality of possible commands. At step 310, a "next" command is received. As discussed above, a next command is received as a result of a user selecting the next command 212 (FIG. 2) in the context menu. A mouse click on a slide also causes a next command to be received. In response to receiving a next command, at step 312, a determination is made of whether the slide show is at the end of the slide presentation. If the slide show is at the end, at step 314, the slide show is terminated. If the slide show is not at the end, at step 316, the slide presentation program advances the slide show. As discussed above, advancing the slide show may include displaying the next build on the current slide or displaying the next slide. After step 316, flow control proceeds to step 309, to wait for a command. As discussed below, if the slide show is configured to automatically advance based on predetermined timings, the expiration of a time corresponding to a build or a slide causes an event that results in a flow of operation equivalent to receiving a "next" command at step 310.

After displaying a slide, the slide presentation program may receive a "previous" command, at step 318. As discussed above, this command is received as a result of a user selecting the previous command 214 (FIG. 2) in the context menu. In response to receiving a previous command, at step 320 the slide presentation program reverses the sequence of displaying builds, as discussed above. This may result in removing a build from a displayed slide or displaying the previous slide in the predetermined sequence of slides. If the current slide is the first slide of the slide show and no builds are displayed, the previous command does not alter the display. After step 320, flow control proceeds to step 309, to wait for a command.

After step 309, the slide presentation program may also receive an "end show" command, at step 322. As discussed above, the "end show" command may be received as a result of a user selecting the end show command 218 (FIG. 2) in the context menu. In response to receiving an end show command, at step 314, the slide presentation program terminates the current slide show.

Figure 4:
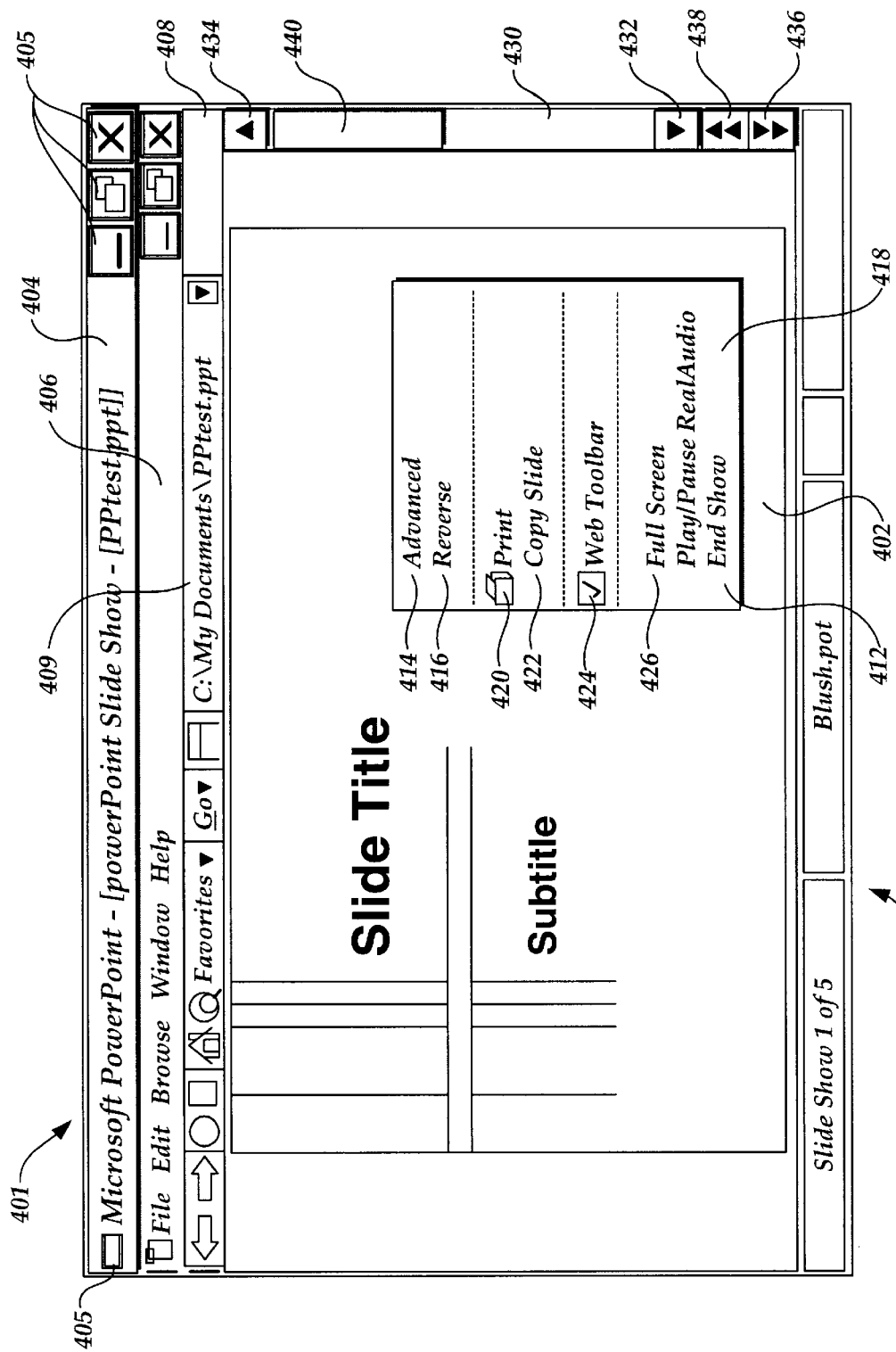
FIG. 4 illustrates a computer display containing a slide and a context menu presented to an individual browser.

FIG. 4 illustrates a display screen 114 containing a slide 402 during an individual browser mode presentation. The slide 402 is displayed within a standard Windows 95® application window 401, which includes a title bar 404 having iconic controls 405 for manipulating the application window. The application window also includes a menu bar 406 that allows a user to select menu commands.

As depicted in FIG. 4, the menu bar 406 includes the titles of five menus, each menu having one or more menu commands. The menu titles are "file," "edit," "browse," "window," and "help." A web browsing toolbar 408 provides a user with the ability to "browse" web sites on the World Wide Web over the Internet, or web pages on an intranet. The web browsing toolbar 408 allows an individual browser, during an individual browser mode slide show, to retrieve slide presentations from the Internet or an intranet. The web browsing toolbar 408 includes a history list drop down control 409 that displays web sites recently "visited." During a slide show, the slide presentation software allows a user to perform normal operating system functions, such as switching to other application windows and performing tasks in other windows.

FIG. 4 also illustrates a context menu 412 that is displayed in response to a user command, such as clicking the right mouse button when the pointer is within the slide boundaries.

The context menu 412 includes an "Advance" command 414 for advancing to the next build, and a "Reverse" command 416 for reverse the build sequence. The advance command 414 and the reverse command 416 operate similarly to the next command 212 (FIG. 2) and the previous command 214 in the context menu 208 corresponding to speaker presentation mode. That is, user selection of the advance command 414 causes the slide presentation program to display the next build on the current slide or, if there are no more builds on the current slide, to display the next slide in sequence. The reverse command 416 causes the slide presentation program to remove the current build on the current slide or, if there are no builds to remove, to remove the current slide and display the previous slide in sequence. If the current slide is the first slide of the slide show and no builds are displayed, the reverse command does not alter the display. The context menu 412 also includes an "end show" command 418 that terminates the current slide show.

The context menu 412 further includes several menu commands that are not available in the speaker presentation mode context menu 208. A "Print" command 420 allows an operator to print one or more slides from the current slide presentation. A "Copy slide" command 422 causes the slide presentation program to copy the current slide, with all builds included, to the operating system clipboard. A "Web Toolbar" command 424 operates as a toggle, and causes the slide presentation program to display or hide the web browsing tool bar 408.

The context menu 412 further includes a "Full screen" menu command 426 that causes the slide presentation program to perform a speaker presentation slide show. When the speaker presentation slide show terminates, the slide presentation program returns to the point in the individual browser mode slide show at which the full screen menu command 426 is selected. In one actual embodiment, a "browse" menu that is displayed in response to a user's selection of the "browse" menu title on the menu bar 406 includes an advance command, a reverse command, and a full screen command. Each of these commands causes the same operation as the corresponding advance command 414, reverse command 416, and full screen command 426 on the context menu 412. Additionally, in the actual embodiment, a "file" menu, which is displayed in response to a user's selection of the "file" menu title on the menu bar 406, includes an "end show" command that serves the same function as the end show command 418 in the context menu 412.

The application window 401 further includes a navigation scrollbar 430, operative for allowing a user to navigate within the current slide show. The navigation scrollbar 430 includes an advance button 432 and a reverse button 434. The advance button 432 and the reverse button 434 operate in the same manner as the advance command 414 and the reverse command 416, respectively, within the context menu 412. The navigation scrollbar 430 also includes a next slide button 436 and a previous slide button 438. The advance slide button 436 causes the slide presentation program to display the next sequenced slide in the slide presentation, regardless of whether there are builds remaining to be displayed on the current slide.

The previous slide button 438 causes the slide presentation program to display the previous sequenced slide in the slide presentation. In one actual embodiment, in response to a user's pressing the previous slide button 438, the slide presentation program displays the previous slide as it appeared the most recent time that the slide was displayed during the current slide show. For example, if the slide prior to the current slide includes three builds, and a user viewing the prior slide selects the advance slide button 436 when the prior slide is displaying only the first build, subsequently pressing the previous slide button 438 causes the prior slide to be displayed with only the first build.

The navigation scrollbar 430 further includes a scroll box 440 positioned between the advance button 432 and the reverse button 434. The vertical position of the scroll box corresponds to the general location of the current slide within the sequence of slides of the slide presentation. Clicking the mouse in the area of the navigation scrollbar 430 below the scroll box 440 and above the advance button 432 performs the same operation as clicking on the advance button 432. Clicking on the area of the navigation scrollbar 430 above the scroll box 440 and below the reverse button 434 causes the same operation as clicking on the reverse button 434. Clicking on the scroll box 440 and dragging it up or down causes the slide presentation program to jump to a slide within the current slide presentation corresponding to the relative vertical position of the scroll box within the navigation scrollbar. The slide displayed as a result of dragging the scroll box 440 is shown containing the builds that were displayed the most recent time the slide was displayed during the current slide show.

Figure 5:
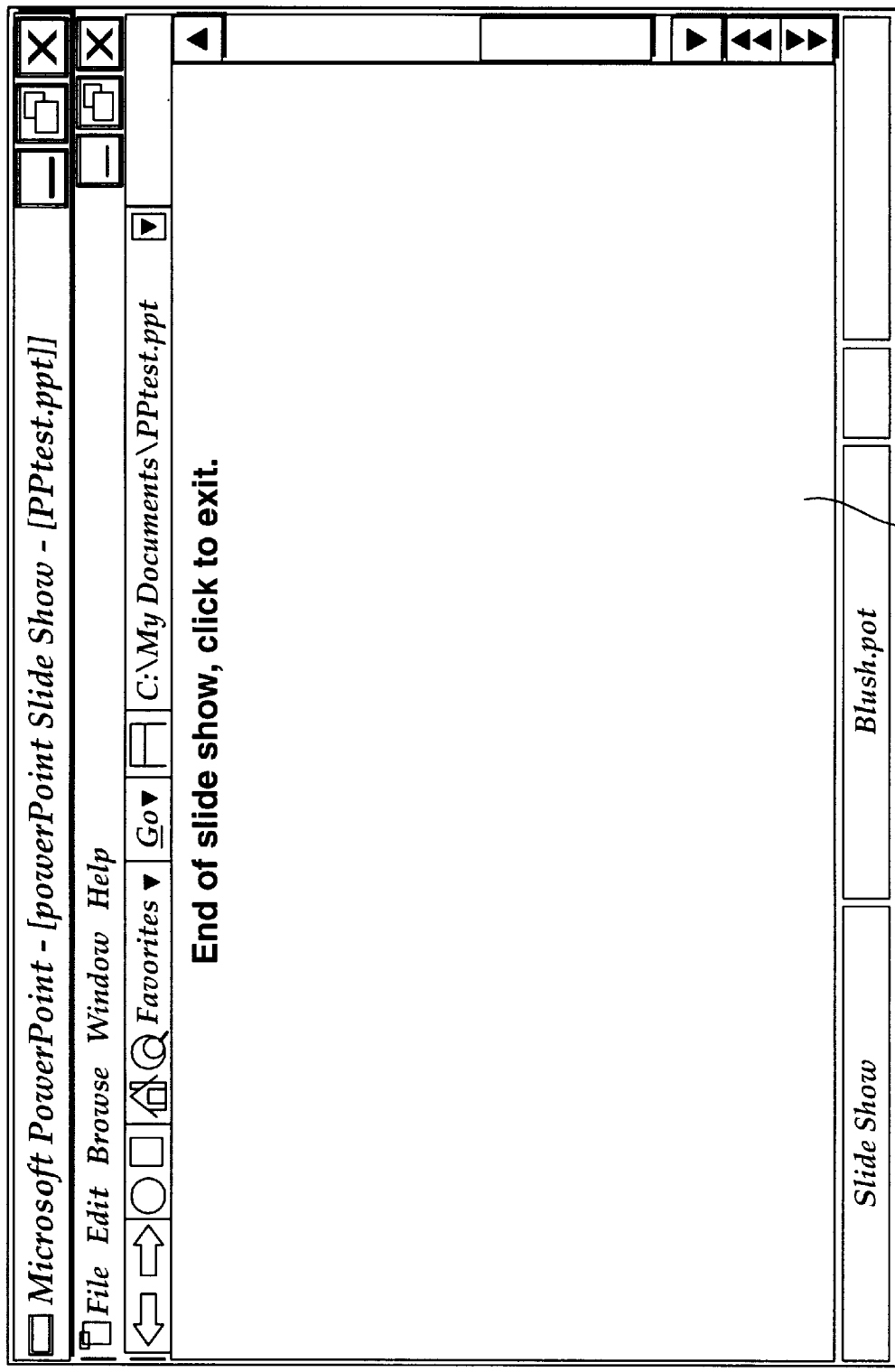
FIG. 5 illustrates a computer display containing a warning slide during an individual browser presentation.

When the last slide in a sequence of slides is displayed during an individual browser slide show, advancing the slide show by using the advance button 432, the next slide button 436, clicking in the area below the scroll box 440, or selecting the advance menu command 414 causes the slide presentation program to display a warning screen 502, illustrated in FIG. 5. When the warning screen 502 is displayed, a command to advance the slide show, such as by selecting the advance button 432, the next slide button 436, clicking on the area in the navigation scrollbar 430 below the scroll box 440, or selecting the advance menu command 414, causes the current slide show to terminate. Clicking the mouse button when the pointer is anywhere within the warning screen also causes the current slide show to terminate. The warning screen 502 preferably contains text instructing a user that an additional advance command causes the slide show to terminate. As discussed below, the navigation scrollbar 430 can optionally be hidden during an individual browser mode slide show.

FIG. 6 illustrates a process 602 of performing a slide show in individual browser mode. At step 604, the slide presentation program sets up an application window for a slide show. This step may include setting up an existing application window or creating a new window. Also at step 604, the pen tool, which is enabled during speaker presentation mode, is disabled.

At step 606, if the navigation scroll bar is enabled, a scroll bar is created. As discussed below, a navigation scroll bar is preferably enabled by default when in individual browser mode. If the scroll bar has not been disabled by a user, it is created at step 606. At step 608, the first slide of the slide show is displayed.

At step 609, the slide presentation program waits for one of a plurality of possible commands. At step 610, an "advance" command is received. As discussed above, an advance command is received as a result of a user selecting the advance command 412 (FIG. 4) in the context menu during an individual browser mode slide show, or selecting the "advance" button 432 in the navigation scroll bar. In response to receiving an advance command, at step 612, a determination is made of whether the slide show is at the end of the slide presentation. If the slide show is at the end, at step 614, a warning message is displayed, as illustrated in FIG. 5. After step 614, flow control proceeds to step 609, to wait for a command.

If, at step 612, the slide show is not at the end, at step 616 a determination is made of whether the warning message is currently being displayed. If the warning message is currently displayed, at step 618, the slide show is terminated. If the warning message is not currently displayed, at step 620, the slide presentation program advances the slide show. As discussed above, advancing the slide show may include displaying the next build on the current slide or displaying the next slide. After step 620, flow control proceeds to step 609, to wait for a command.

After step 609, the slide presentation program may receive a "next slide" command, at step 622. As discussed above, the next slide command is received as a result of a user selecting the next slide button 436, clicking on the area in the navigation scrollbar 430 below the scroll box 440, or selecting the advance menu command 414, as illustrated in FIG. 4. In response to receiving a next slide command, at step 624, a determination is made of whether the slide show is at the end of the slide presentation. If the slide show is at the end, flow control proceeds to step 614, where a warning message is displayed, as discussed above. If the slide show is not at the end, at step 626 a determination is made of whether the warning message is currently being displayed. if the warning message is currently displayed, at step 629, the slide show is terminated. if the warning message is not currently displayed, at step 620, the slide presentation program displays the next slide in the predetermined sequence of slides. After step 630, flow control proceeds to step 609, to wait for a command.

After step 609, the slide presentation program may receive a "reverse" command, at step 632. In response to receiving a reverse command, the slide presentation program reverses the sequence of slides and builds, as discussed above. After step 634, flow control proceeds to step 609, to wait for a command.

After step 609, the slide presentation program may receive a "previous slide" command, at step 636. In response to receiving a reverse command, the slide presentation program displays the previous slide in the predetermined sequence of slides, as discussed above. After step 638, flow control proceeds to step 609, to wait for a command.

After step 609, the slide presentation program may receive an "end show" command, at step 640. As discussed above, the "end show" command may be received as a result of a user selecting the end show command 418 (FIG. 4) in the context menu. In response to receiving an end show command, at step 642, the slide presentation program terminates the current slide show.

FIG. 7 illustrates a computer display screen 114 containing a slide 702 during a kiosk browser mode slide presentation. The slide 702 is sized to fill the display area of the display screen 114, as in the speaker presentation mode slide show. Preferably, during a kiosk browser mode slide show, the navigation scrollbar 430 and the context menu 412 illustrated in FIG. 4 are not available. During a kiosk browser mode slide show, the slide presentation program provides a viewer with one or more hyperlink buttons 704 for navigating between slides. A hyperlink button 704 is created and inserted onto a slide by a slide presentation author during the creation or editing of a slide presentation. A hyperlink button 704 comprises a visual component and information that designates a target slide. The appearance of a hyperlink button 704 is selected by a slide presentation author, and is not limited to the exemplary hyperlink button 704 depicted in FIG. 7. However, a user viewing a kiosk browser mode slide show is limited to the predetermined sequences that are enabled by the hyperlink buttons. A hyperlink button may designate its corresponding target slide to be a slide in a presentation other than the presentation containing the hyperlink button. A hyperlink's address information may specify that the target slide exists on a remote computer, such as a World Wide Web (WWW) server or an intranet server. A Uniform Resource Locater (URL) can be used to specify the location of a slide presentation on a remote computer. The use of URLs is well-known to those skilled in the art of computer network programming, and is not discussed in further detail herein. The slide presentation program uses the target slide information to jump to the target slide when the corresponding hyperlink button is selected by a slide show viewer. Preferably, a slide presentation author inserts hyperlink buttons to create one or more sequences of slides that are presented to a viewer. A slide may contain more than one hyperlink button, allowing a viewer to select from alternative viewing sequences.

Hyperlink buttons are not limited to use during a kiosk browser mode slide show. They are also available during a speaker presentation mode slide show and an individual browser mode slide show. However, during a kiosk presentation mode slide show, hyperlink buttons are preferably the only mechanism for navigation among slides.

Some kiosk browser mode viewers may not view a complete slide show. For example, a viewer may abandon the computer after locating some desired information. Since the kiosk browser mode user interface does not provide a mechanism for directly restarting a slide show, a kiosk browser mode slide show provides a mechanism for restarting a slide show if there is no user activity for a predetermined period of time. After the predetermined amount of time has passed, the slide presentation program automatically returns to the first slide of the slide presentation. A new user that approaches a computer system running a kiosk browser mode slide show is therefore presented with the beginning of the slide show.

Additionally, a kiosk browser mode slide show automatically loops continuously through a slide presentation. When a slide show terminates in kiosk browser mode, the slide presentation program automatically returns to the first slide of the slide presentation and begins the slide show. If the slide show is set to automatically advance according to predetermined timings, a slide show running in kiosk browser mode automatically advances through the slide presentation and repeats the slide show indefinitely, without user intervention.

Figure 8:
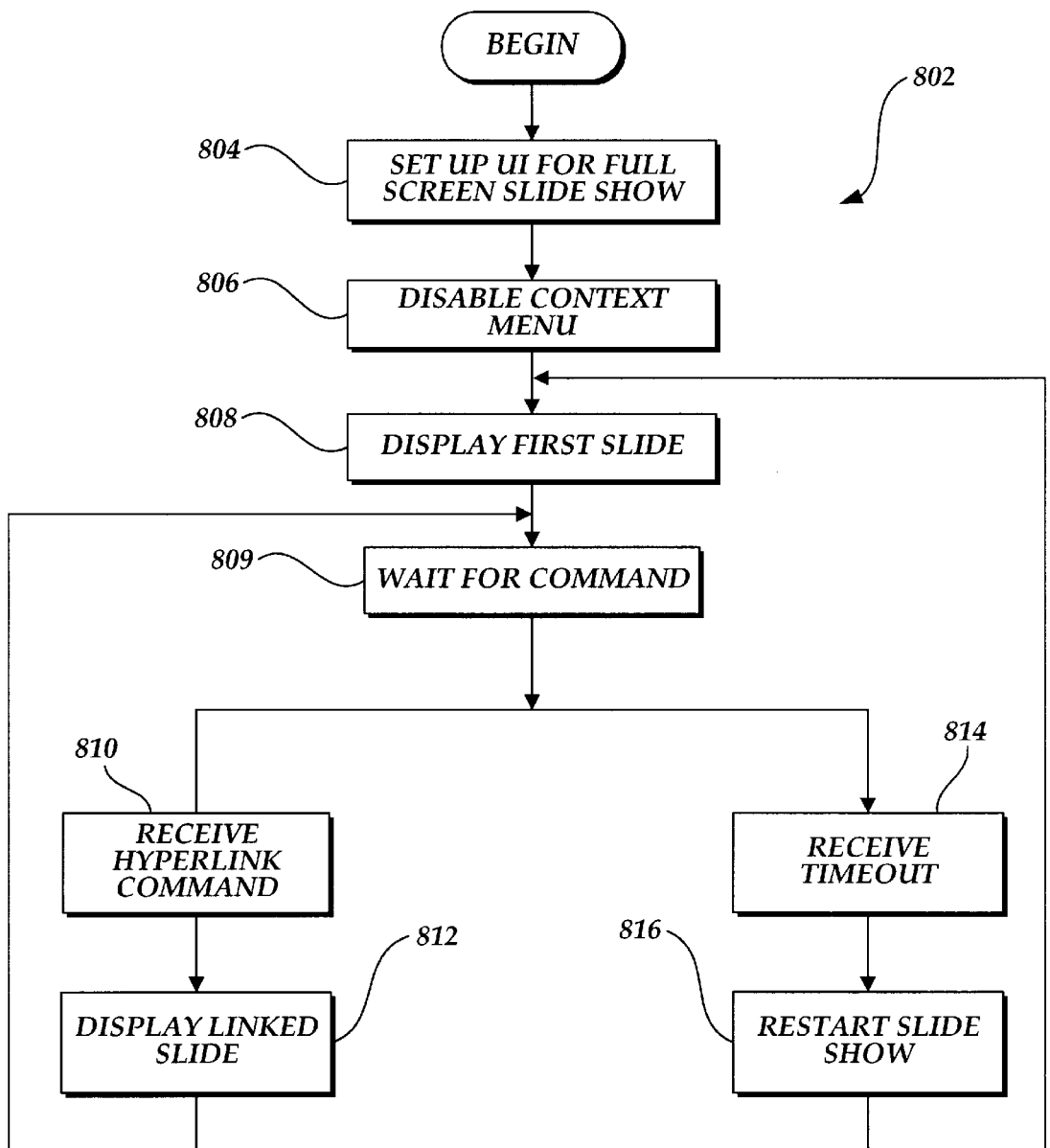
FIG. 8 is a flow diagram illustrating the process of performing a kiosk browser mode slide show.

FIG. 8 illustrates a process 802 of performing a slide show in kiosk browser mode. At step 804, the user interface is set up to display slides sized to fill the display screen 114 (FIG. 1). At step 806, the context menu is disabled. At step 808 the slide presentation program displays the first slide of the slide show.

At step 809, the slide presentation program waits for one of a plurality of possible commands. At step 810, a hyperlink command is received as a result of a user clicking on a hyperlink button. At step 812, the linked slide is displayed. After step 812, flow control proceeds to step 809, to wait for a command.

After step 809, the slide presentation program may receive a timeout, at step 814. As discussed above, a timeout occurs if there is no user input for a predetermined period of time. A timeout also occurs after the last slide of the slide show is displayed for a predetermined period of time. In response to receiving a timeout, at step 816, the slide show is restarted. Flow control proceeds to step 806, where the first slide of the slide show is displayed.

Figure 6A:
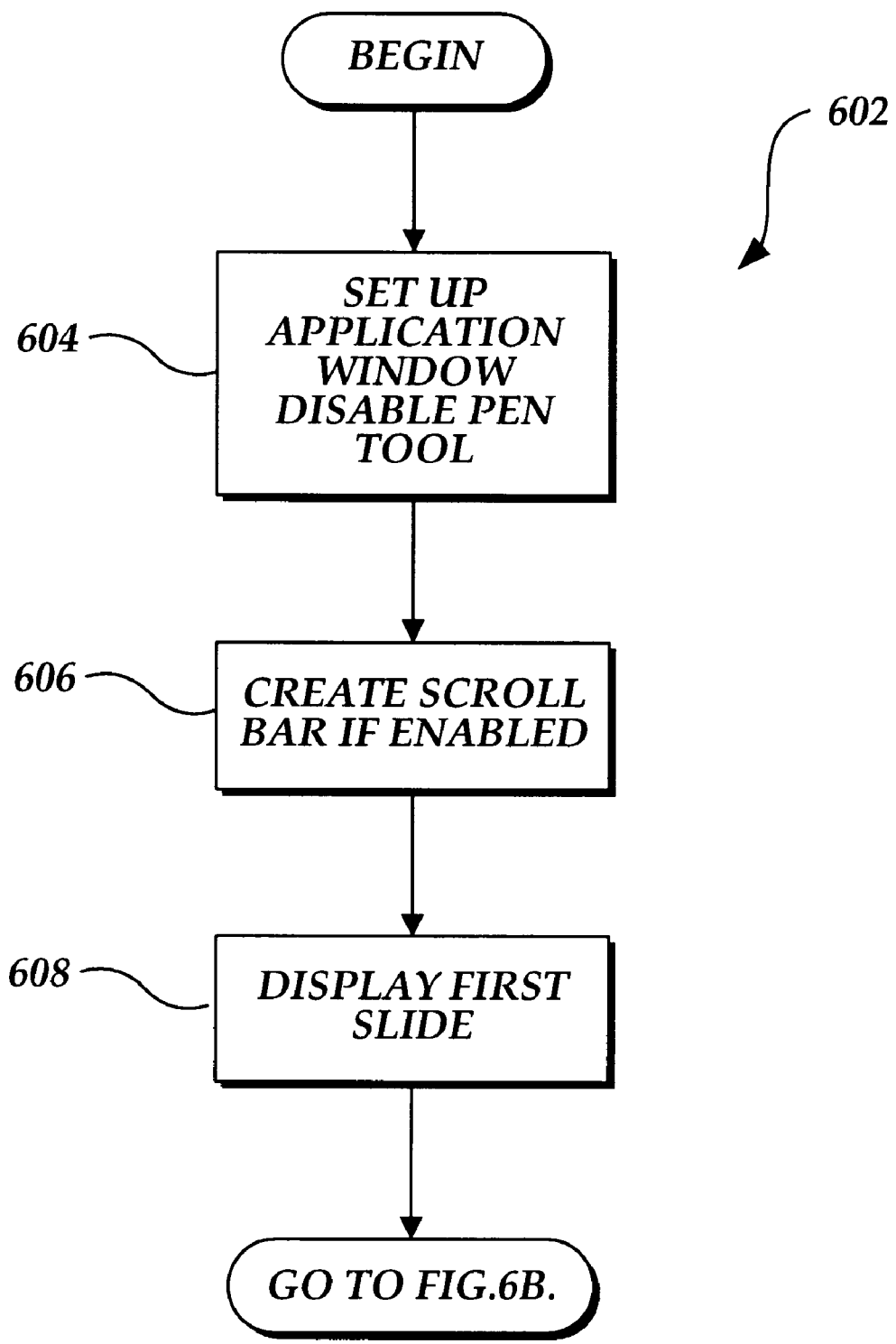
FIG. 6 is a flow diagram illustrating the process of performing an individual browser mode slide show.
Figure 6B:
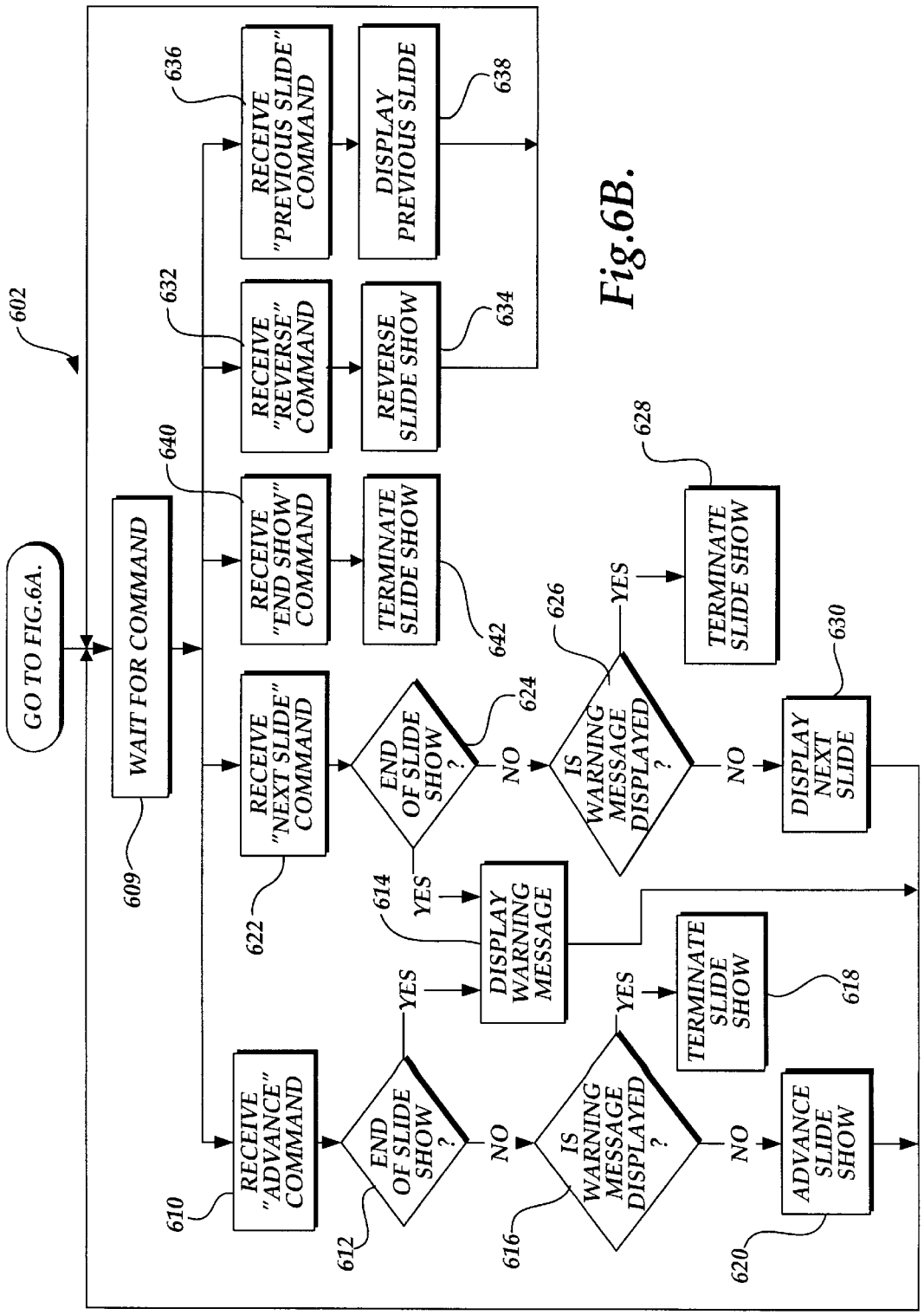
Figure 9A:
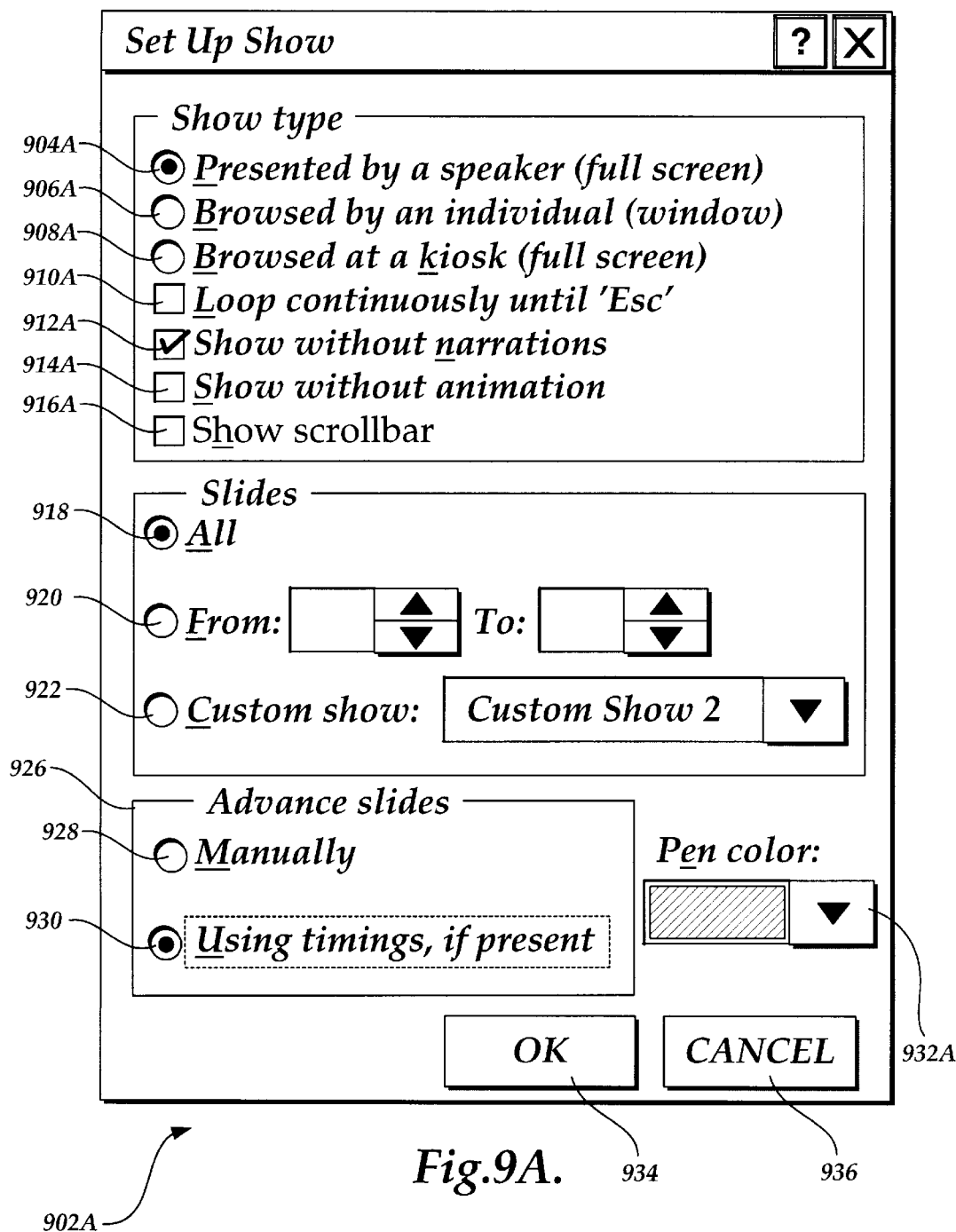
FIGS. 9A–C comprise a series of views that illustrate a dialog window for allowing a user to select browsing modes and options.

FIGS. 6A to 6C illustrate a "Set Up Show" dialog window 902*a–c* that is provided by a slide presentation program in accordance with the present invention. The "Set Up Show" dialog window 902a–c allows a slide presentation author to specify the slide show mode and related settings. The "Set Up Show" dialog window 902a depicted in FIG. 9A illustrates the dialog window wherein a selection of the speaker presentation mode is made. The speaker mode radio button 904a, the individual browser mode button 906a, and the kiosk browser mode button 908a provide a user with a selection of exactly one slide show mode. As depicted in FIG. 9A, the speaker presentation mode radio button 904a is selected.

A "Loop continuously" check box 910a provides a choice whether to restart a slide show automatically when the slide show terminates. A "Show without narrations" check box 912a provides a user with an option to perform the slide show with prerecorded narrations. A "Show without animation" check box 914a provides a user with a choice of whether to present the slide show with animations. If the option to show without animation is selected, when a slide is viewed, all objects within the slide are displayed, including all builds, without the incremental display of objects, as animation provides. When an individual browser mode slide show is performed without animation, the advance button 432 and reverse button 434 operate the same as the next slide button 436 and previous slide button 438 on the navigation scrollbar 430 (FIG. 4). A "Show scrollbar" check box 916a is disabled, and not available for selection when speaker presentation mode is selected.

A "Slides" group box 918 contains an "All" radio button 920, a "From" radio button 922, and a "Custom show" radio button 924. These radio buttons allow a slide presentation author to select slides that are to be included in the slide show.

An "Advance slides" group box 926 contains a "Manually" radio button 928 and a "Using timings" radio button 930. These radio buttons provide a presentation author with a choice of whether to use preset timings to automatically advance slides in the slide show. During a speaker presentation slide show, manual advancement commands, as described above, are always available, even if the "Using timings" radio button 930 is selected.

A "pen color" drop down control 932a provides a speaker with a selection of pen colors that are used when writing on the display screen, as discussed above. An "OK" button 934 and a "Cancel" button 936 cause the slide presentation program to accept modifications made within the "Set Up Show" dialog window 902a.

Figure 9B:
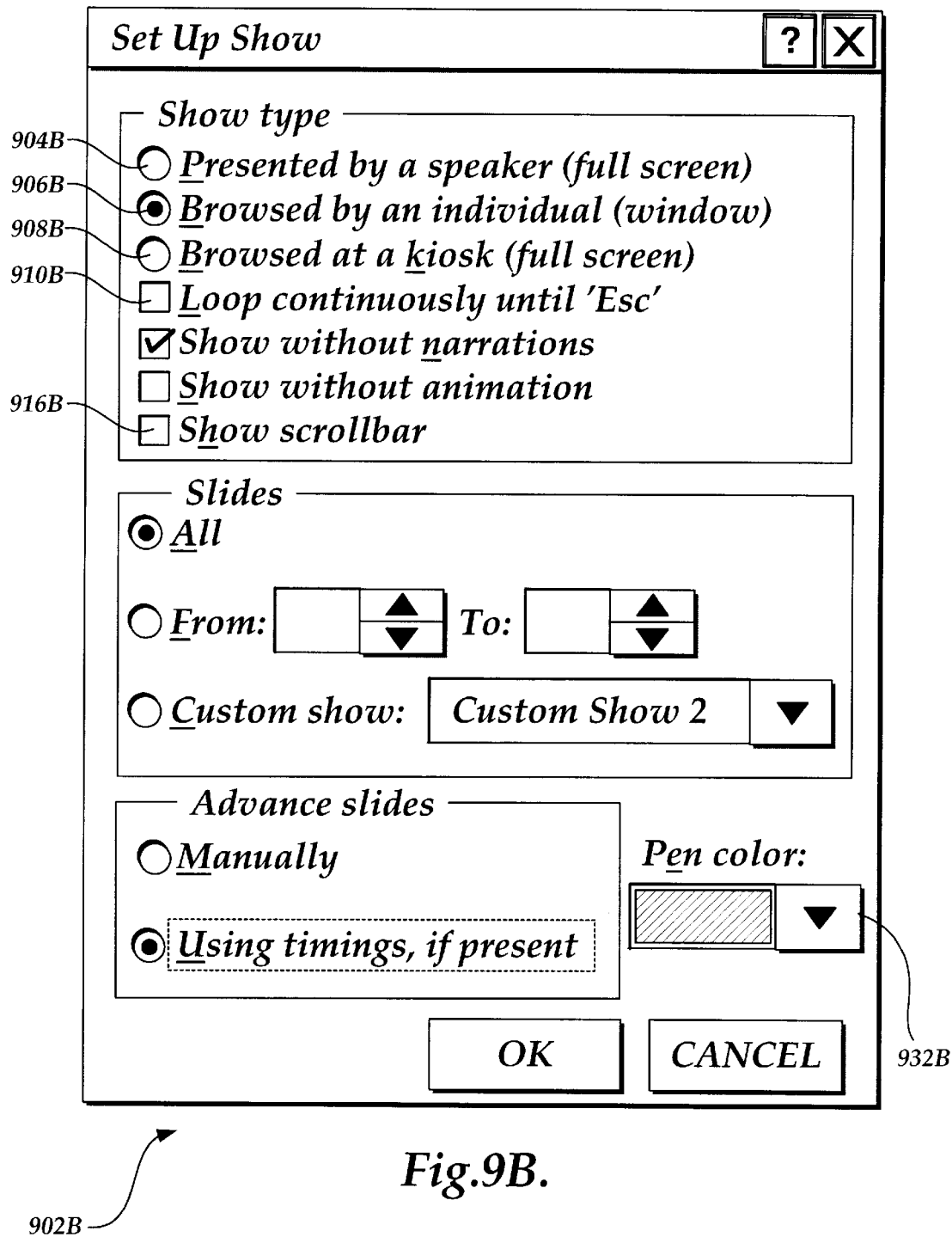

The "Set Up Show" dialog window 902b depicted in FIG. 9B illustrates the dialog window wherein a selection of the individual browser mode is made. As depicted in FIG. 9B, the individual browser mode button 906b is selected, and the speaker mode radio button 904b and kiosk browser mode button 908b are unselected. The "Set Up Show" dialog window 902b depicted in FIG. 9B includes the same controls as depicted in FIG. 9A, and are discussed here only in so far as they differ from the controls depicted in FIG. 9A.

A "Show scrollbar" check box 916b is enabled when individual browser mode is selected. When the "Show scrollbar" check box 916b is selected, the slide presentation software displays the navigation scrollbar 430 (FIG. 4), which is operative for navigating within the slide show, as discussed above. Preferably, the "Show scrollbar" check box 916b is enabled by default when individual browser mode is selected. However, a user can override the default setting by deselecting the "Show scrollbar" check box 916b.

When individual browser mode is selected, the "Pen color" drop down control 932b is disabled, and therefore inoperative. The slide presentation program automatically prevents a viewer in individual browser mode from writing on the display screen.

Figure 9C:
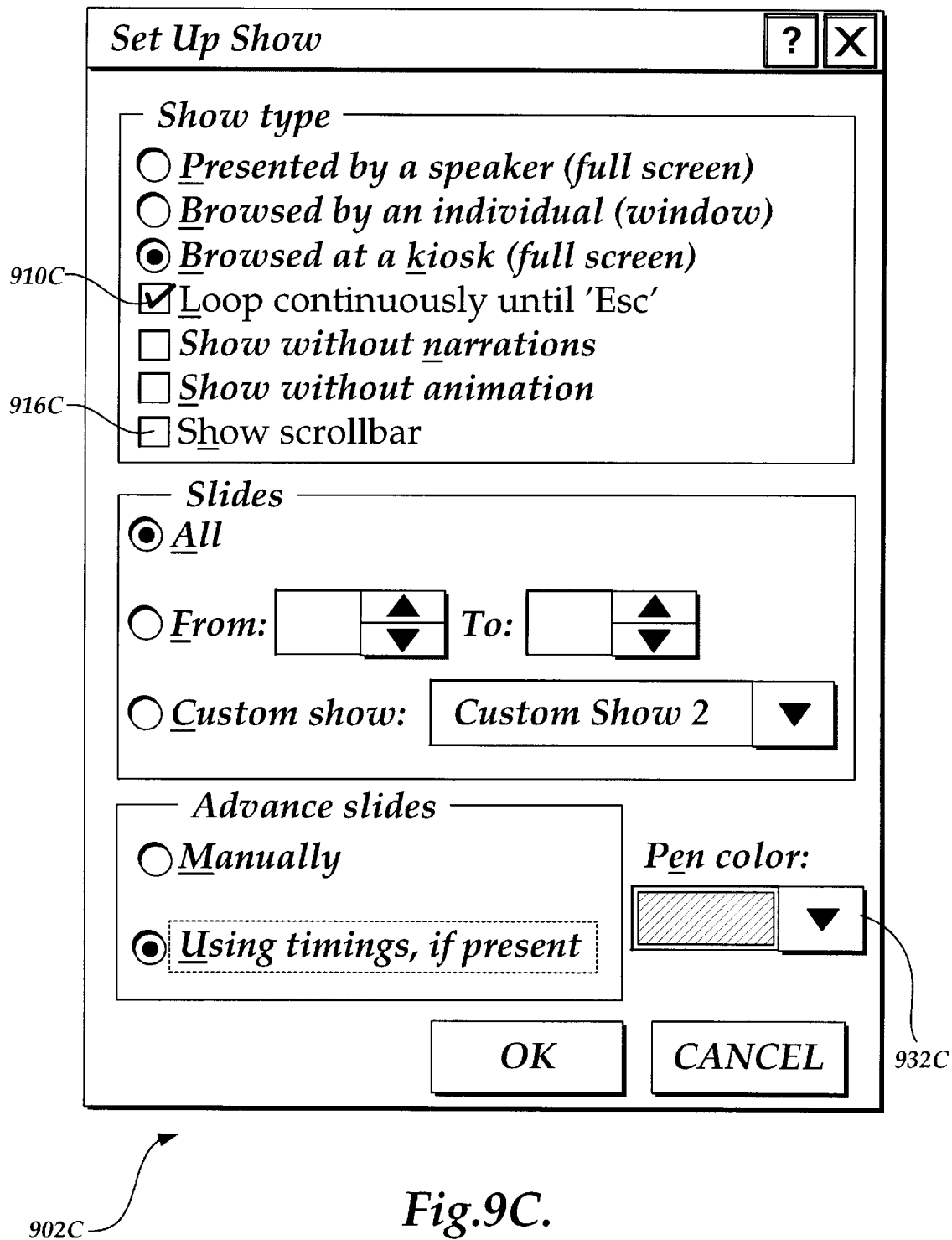

The "Set Up Show" dialog window 902c depicted in FIG. 9C illustrates the dialog window wherein a selection of the kiosk browser mode is made. As depicted in FIG. 9C, the kiosk browser mode radio button 908c is selected.

The "Loop continuously" check box 910c is selected and disabled when kiosk browser mode is selected. As discussed above, in kiosk browser mode, the slide presentation software automatically loops continuously, returning to the first slide after the slide show terminates. The software prohibits a user from deselecting the "Loop continuously" check box 910c.

The "Show scrollbar" check box 916c is deselected and disabled when kiosk browser mode is selected. The navigation scrollbar 430 (FIG. 4) is unavailable when viewing a slide show in kiosk browser mode.

The "Pen color" drop down control 932c is also disabled when kiosk browser mode is selected. A user viewing a slide show in kiosk browser mode cannot write on the display screen.

The following table summarizes the user interface and navigational features pertaining to the three slide show modes, as discussed above.

| Feature | Speaker Presentation | Individual Browser | Kiosk Browser |
|---|---|---|---|
| Display screen | Full screen | Window | Full screen |
| Browsed document history list | No | Yes | No |
| Navigation scrollbar | No | Optional default = yes | No |
| Loop continuously | Optional | Optional | Always |
| Automatically restart after inactivity | No | No | Yes |
| Click on slide advances to next slide | Yes | No | No |
| Navigate by hyperlinks | Yes | Yes | Yes (no other navigation available) |
| Show without narrations | Optional | Optional | Optional |
| Pen pointer available for onscreen writing | Yes | No | No |
| Advance by timer | Optional | Optional | Optional |
| End with black warning slide | No | Yes | No |
| Context menu available during slide show | Yes | Yes | No |

As illustrated in the table, and discussed above, in speaker presentation and kiosk browser mode, each slide is sized to the extent of a full screen. In individual browser mode, each slide is displayed within an application window. In individual browser mode, a browsed document history list is available. The history list is not available in speaker presentation mode and kiosk browser mode. In individual browser mode, a navigation scrollbar is included in the user interface. A user can select an option to not include the navigation scrollbar during individual browser mode. In speaker presentation mode and kiosk browser mode, the navigation scrollbar is unavailable.

In kiosk browser mode, a slide show loops continuously, starting a new slide show each time the slide show completes. In speaker presentation mode and individual browser mode, a user can optionally set a slide show to loop continuously. In kiosk browser mode, after a predetermined period of inactivity by a user, the slide show automatically restarts. This function is operational only if slide timings are not used. In speaker presentation mode and individual browser mode, the slide show does not automatically restart after a period of inactivity. In speaker presentation mode, clicking on a slide during a slide show advances the slide show to the next slide show in sequence. This navigational feature is not available in individual browser mode and kiosk browser mode.

In all three modes of operation, a user is provided with the ability to navigate by manipulating hyperlinks. Preferably, in kiosk browser mode, no other navigational mechanisms are available to a user.

In speaker presentation mode, individual browser mode, and kiosk browser mode, a user is provided with an option of viewing a slide show without narrations. By default, narrations are played during a slide show.

In speaker presentation mode, a pen pointer is provided to a speaker during a slide show, thereby allowing the speaker to write on a screen. In individual browser mode and kiosk browser, a viewer is restricted from writing on the display screen. In all three modes of operation, the slide show program optionally advances each slide according to predetermined stored times. In individual browser mode, the last slide of a slide show is followed by a warning slide instructing a viewer that an additional advance command terminates the slide show. The warning slide is not provided in speaker presentation mode and kiosk browser mode.

In speaker presentation mode, a context menu is available during a slide show. In one actual embodiment, clicking the right mouse button when the pointer is within a slide causes the display of a context menu. A context menu button is also available in the lower left corner of a display screen in speaker presentation mode. Clicking on the context menu button causes the context menu to be displayed.

A context menu is also available during an individual browser slide show, preferably by clicking the right mouse button when the pointer is within a slide. As discussed above, the contents of the individual browser mode context menu differ from the speaker presentation mode context menu. The invention does not provide a context menu in kiosk browser mode.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. Method for displaying a slide show presentation having a plurality of slides, each slide including at least one object for display, the method comprising:
    (a) displaying each slide within a graphical user interface window;
    (b) displaying a navigation scrollbar having a next slide button, a previous slide button, an advance button, and a reverse button;
    (c) controlling the display of slides within the graphical user interface window by selectively manipulating the next slide button or the previous slide button; and
    (d) controlling the display of a build for an object in a slide by selectively manipulating the advance button or the reverse button, the manipulation of the advance button causing the build for the object to be displayed in the slide and the manipulation of the reverse button causing a previously displayed build for the object to not be displayed in the slide.

2. The method of claim 1, further comprising:
    (a) displaying a menu having an advance command item and a reverse command item; and
    (b) controlling the display of the build for the object in the slide by selectively manipulating the advance command item or the reverse command item, the manipulation of the advance command item causing the build for the object to be displayed and the manipulation of the reverse command item causing the previously displayed build for the object to not be displayed in the slide.

3. The method of claim 2, further comprising manipulating the position of the graphical user interface window during the electronic slide show.

4. The method of claim 2, further comprising:
    (a) displaying a warning message in response to a manipulation of the advance button, the next slide button, and the advance command item; and
    (b) terminating the slide show in response to another manipulation of the advance button, the next slide button, and the advance command item subsequent to the display of the warning message.

5. Method for displaying a slide show presentation having a plurality of slides, each slide including at least one object that is displayable, the method comprising:
    (a) selecting one of a plurality of presentation modes for displaying the performance of the slide show;
    (b) when a speaker presentation mode is selected, performing the speaker presentation mode for displaying the slide show, including:
        (i) displaying each slide of the slide show in a fill screen format for a display screen; and
        (ii) providing a pen tool for displaying writing on the display screen; and
    (c) when an individual browser presentation mode is selected, performing the individual browser presentation mode for viewing the slide show, including:
        (i) displaying each slide within a graphical user interface window;
        (ii) providing a navigation scrollbar for controlling the display of slides in the electronic slide show;
        (iii) controlling the display of slides within the graphical user interface window by selectively manipulating the navigation scrollbar; and
        (iv) controlling the display of a build for an object in a slide by selectively manipulating the navigation scrollbar.

6. The method of claim 5, wherein the navigation scrollbar comprises a next slide button, a previous slide button, an advance button, and a reverse button, and wherein the individual browser presentation mode further comprises:
    (a) controlling the display of the build for the object in the slide by selectively manipulating the advance button or the reverse button; and
    (b) controlling the display of slides within the graphical user interface window by selectively manipulating the next slide button or the previous slide button.

7. The method of claim 6, wherein the individual browser presentation mode further comprises:
    (a) providing a menu having an advance command item and a reverse command item; and
    (b) controlling the display of the build for the object in the slide by selectively manipulating the advance command item or the reverse command item.

8. The method of claim 5, wherein the individual browser mode further comprises preventing the display of writing on the display screen during the slide show.

9. The method of claim 5, further comprising a kiosk browser presentation mode for displaying the slide show, the kiosk browser presentation mode including:
   (a) displaying each slide of the slide show in the full screen format for the display screen; and
   (b) automatically restarting the slide show in response to the termination of the slide show.

10. The method of claim 5, further comprising providing a kiosk browser presentation mode for displaying the slide show, the kiosk browser presentation mode including:
   (a) displaying each slide of the slide show in the full screen format for the display screen;
   (b) automatically determining a length of time since receiving an input command; and
   (c) automatically restarting the slide show if the length of time since receiving the input command exceeds a predetermined length of time.

11. The method of claim 5, further comprising providing a kiosk browser presentation mode for displaying the slide show, the kiosk browser presentation mode including:
   (a) displaying each slide of the slide show in the full screen format for the display screen; and
   (b) providing at least one button on each slide for navigating to another slide in the slide show.

12. A system for controlling the performance of a slide show, the slide show including at least one slide, the system comprising:
   (a) a computer including a computer memory and an operating system;
   (b) a display device having an associated display screen, the display device coupled to the computer for providing a display of the slide show;
   (c) a slide presentation program for displaying a set of at least one slide within a graphical user interface window on the display screen; and
   (d) a navigation scrollbar having an advance button for advancing the performance of the slide show and a reverse button for reversing the performance of the slide show, wherein manipulation of the advance button causes:
      (i) displaying a build for an object when the build for the object remains to be displayed on a currently displayed slide; and
      (ii) displaying a subsequent slide in the slide show when the build for the object does not remain to be displayed on the currently displayed slide.

13. The system of claim 12, wherein the navigation scrollbar further comprises:
   (a) a next slide button for displaying a subsequent slide in the slide show; and
   (b) a previous slide button for displaying a previously displayed slide in the slide show.

14. The system of claim 12, further comprising a menu having an advance command item for advancing the performance of the slide show and a reverse command item for reversing the performance of the slide show, the manipulation of the advance command item causing the build for the object to be displayed and the manipulation of the reverse command item causing a previously displayed build for the object to not be displayed in the slide.

15. The system of claim 12, further comprising:
   (a) a warning message that is displayed in response to manipulation of the advance button to advance the performance of the slide show; and
   (b) a mechanism for terminating the slide show in response to manipulation of the advance button to advance the slide show when the last slide in the slide show is displayed.

16. The system of claim 12, wherein the slide presentation program controls the display of writing on the display screen.

17. A system for controlling the display of a slide show, the slide show including at least one slide, the system comprising:
   (a) a computer including a computer memory and an operating system;
   (b) a display device having an associated display screen, the display device coupled to the computer for providing a display;
   (c) a slide presentation program for sequentially displaying a set of at least one slide within a graphical user interface window on the display screen;
   (d) a scrollbar for navigating within the slide show;
   (e) a menu comprising menu commands for navigating within the slide show; and
   (f) a control for controlling the display of a build for an object in a currently displayed slide.

18. Method for displaying a slide show having a plurality of slides, each slide including at least one object for display, the method comprising:
   (a) displaying the slide show in a presentation mode selected from the group consisting of a speaker presentation mode, an individual browser presentation mode, and a kiosk browser presentation mode;
   (b) displaying each slide in a full screen format when the speaker presentation mode is selected;
   (c) displaying each slide in a graphical user interface window when the individual browser presentation mode is selected;
   (d) displaying a navigation scrollbar and navigating the display of the plurality of slides in the slide show in response to selective manipulation of the navigation scrollbar when the individual browser presentation mode is selected; and
   (e) enabling the control of a display of a build for an object in a slide.

19. The method of claim 18, wherein the navigation scrollbar includes a next slide button, a previous slide button, an advance button, and a reverse button, the method further comprising:
   (a) controlling the display of slides within the graphical user interface window by selectively manipulating the next slide button or the previous slide button when the individual browser presentation mode is selected; and
   (b) controlling the display of a build for an object in the slide by selectively manipulating the advance button or the reverse button when the individual browser presentation mode is selected.

20. The method of claim 18, further comprising:
   (a) displaying each slide in a full screen format if kiosk browser mode is selected; and
   (b) automatically restarting the slide show if kiosk browser mode is selected and an input command is not received during a predetermined period of time.

21. Method for displaying a slide show presentation associated with a plurality of slides, each slide including at least one object, comprising:
   (a) displaying each slide in an order determined by the slide show presentation;
   (b) when a slide is displayed, enabling the display of a control for a build associated with an object in the displayed slide; and (c) enabling the control to cause a build for an object to be displayed in the slide and to cause a previously displayed build for the object to not be displayed in the slide.

22. The method of claim 21, further comprising selecting one of a plurality of presentation modes for displaying the slide show presentation, the plurality of presentation modes comprising speaker presentation, individual browser presentation and kiosk browser presentation.

23. The method of claim 21, wherein the build for the object comprises a graphic and text.

24. Method for displaying a slide show presentation associated with a plurality of slides, each slide including at least one object, comprising:

(a) selecting one of a plurality of presentation modes for displaying the slide show presentation;

(b) displaying each slide in an order determined by the slide show presentation, a slide being displayed in a format determined by the selected presentation mode;

(c) when the slide is displayed, enabling the display of a control for a build associated with an object in the displayed slide; and (d) enabling the control to cause the build for the object to be displayed in the slide and to cause a previously displayed build for the object to not be displayed in the slide.

25. A computer readable media having instructions for performing the steps recited in claims 1, 5, 12, 17, 18, 21 or 24.

* * * * *

UNITED STATES PATENT AND TRADEMARK OFFICE
CERTIFICATE OF CORRECTION

PATENT NO. : 6,008,807
DATED : December 28, 1999
INVENTOR(S) : R. Bretschneider et al.

It is certified that error appears in the above-identified patent and that said Letters Patent is hereby corrected as shown below:

| COLUMN | LINE | |
|---|---|---|
| 2 | 52 | "causes" should read --cause-- |
| 4 | 7 | after "data" insert --.-- |
| 6 | 65 | "for reverse the" should read --for reversing the-- |
| 14 (Claim 5, | 30 line 9) | "fill screen" should read --full screen-- |

Signed and Sealed this

Fifteenth Day of May, 2001

Attest:

NICHOLAS P. GODICI

*Attesting Officer*  Acting Director of the United States Patent and Trademark Office